No. 871,624.
PATENTED NOV. 19, 1907.
J. B. PITCHER.
VEHICLE SEAT.
APPLICATION FILED SEPT. 28, 1906.
2 SHEETS—SHEET 2.
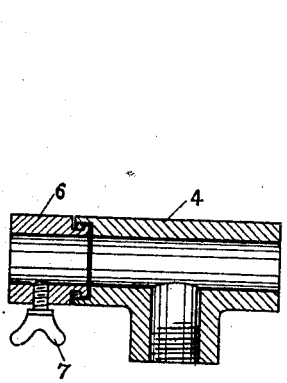
FIG. 5
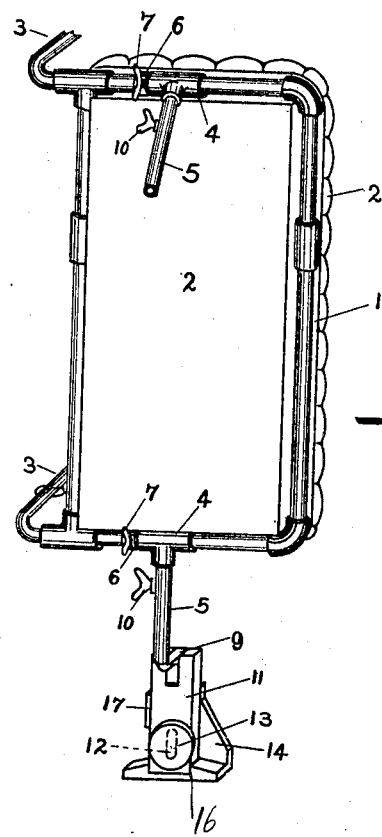
FIG. 2
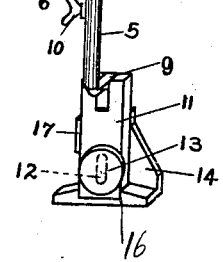
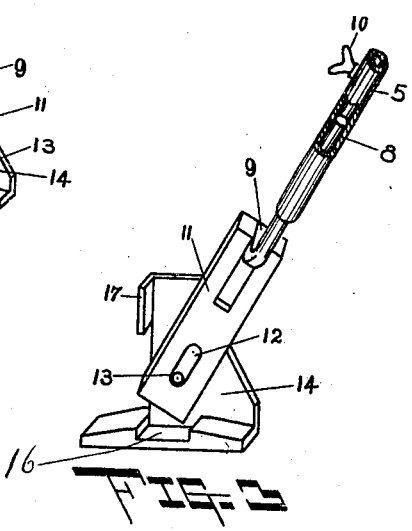
FIG. 3
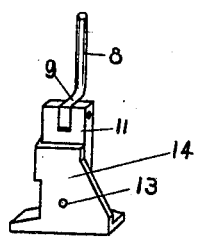
FIG. 4
WITNESSES:
J. Ray Abbey
Ralph S. Warfield
INVENTOR
James Bert Pitcher
BY
Geo. B. Willcox
ATTORNEY No. 871,624. PATENTED NOV. 19, 1907.
J. B. PITCHER.
VEHICLE SEAT.
APPLICATION FILED SEPT. 28, 1906.
2 SHEETS—SHEET 1.
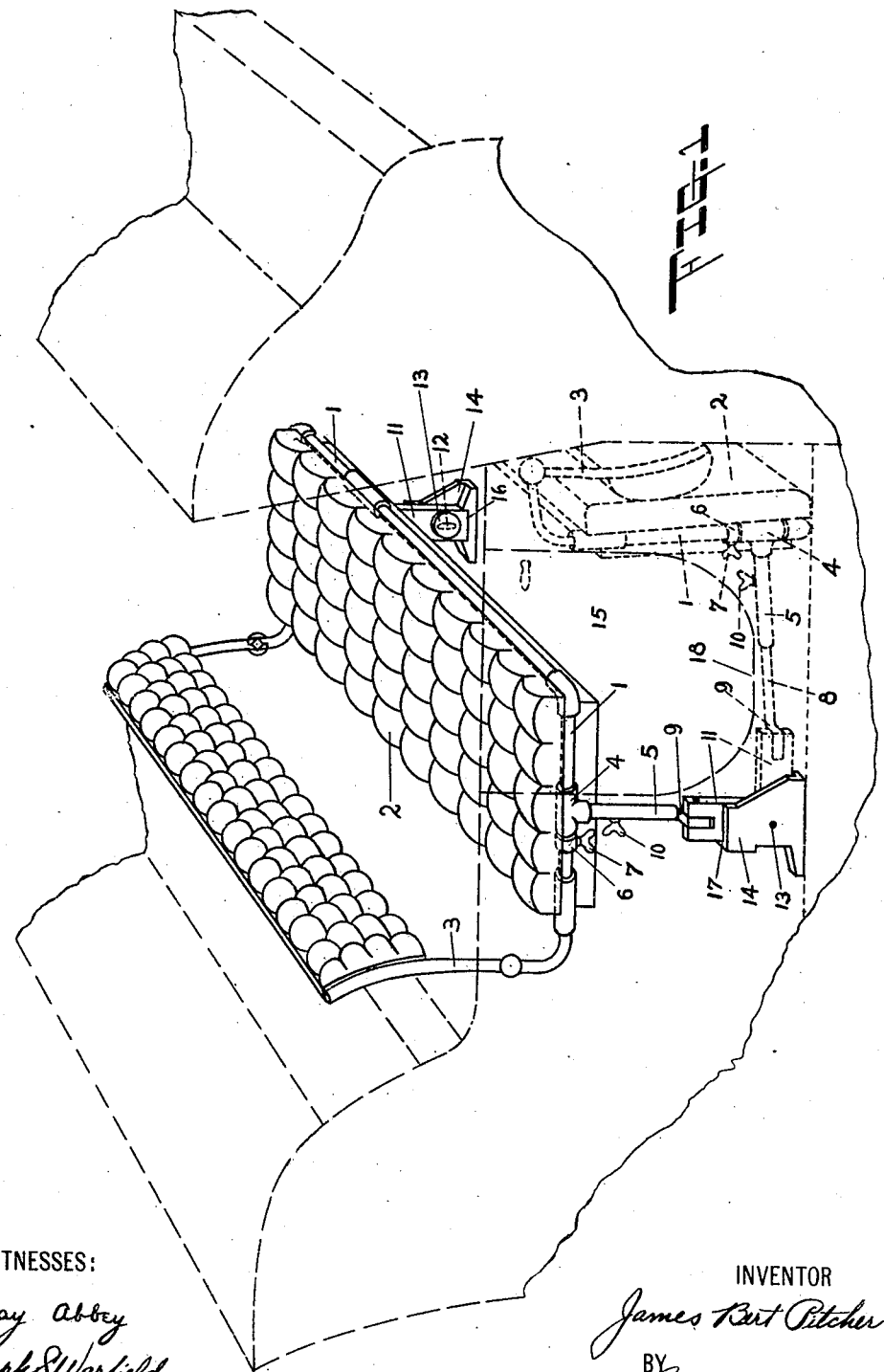
WITNESSES:
J. Ray Abbey
Ralph S. Warfield
INVENTOR
James Bert Pitcher
BY
Geo. B. Willcox
ATTORNEY

UNITED STATES PATENT OFFICE.

JAMES BERT PITCHER, OF SAGINAW, MICHIGAN.

VEHICLE-SEAT.

No. 871,624.

Specification of Letters Patent.

Patented Nov. 19, 1907.

Application filed September 28, 1906. Serial No. 336,595.

*To all whom it may concern:*

Be it known that I, JAMES BERT PITCHER, a citizen of the United States, residing at Saginaw, in the county of Saginaw and State of Michigan, have invented certain new and useful Improvements in Vehicle-Seats; and I do hereby declare the following to be a full, clear, and exact description of the invention, such as will enable others skilled in the art to which it appertains to make and use the same.

My invention relates to adjustable auxiliary seats for vehicles, one object of which is to provide a seat which can be regulated in height to suit the convenience of the parties seated thereon.

Another object is the provision of a seat so arranged as to facilitate the entrance and exit of persons from either side of the vehicle.
A further object is the provision of a seat, which, when not in use, is capable of being swung down out of the way of the occupants of the vehicle.

Auxiliary or temporary seats have been devised ere this, such seats being located between the front and back seats of the vehicle, and in the space therebetween. Unless some provision is made for removing them, it is very difficult for those who are to occupy the back seat to attain their position, and the necessary location of the temporary seat in the free space between the front and back seats often necessitates climbing over such temporary seat, when entering or leaving the vehicle. My invention obviates this difficulty.

Furthermore, while it may be old to provide a forwardly or rearwardly swinging seat, the supports of such seats are not arranged to lie on a level with or beneath the threshold of a vehicle, but on the contrary, lie above the threshold, affording an excellent obstruction for tripping the unwary, when getting in or out of the vehicle. My invention is designed to lie, at least, on a level with the threshold and preferably below the same, to avoid constituting an obstruction of this character.

The invention, while applicable to various kinds of vehicles, is here shown in combination with a motor car or automobile. It will be remembered that the old style tonneau was provided with a door in the back, through which entrance to and egress from the tonneau was obtained. Obviously, this door reduced the seating capacity of the tonneau and various expedients were resorted to, to utilize this space for a seat. The present style tonneau is provided with two doors, one on each side, to permit getting in or out of the vehicle from either side thereof. Obviously, the only place for the auxiliary seat is in line with the doors, hence it becomes desirable to so arrange the seat to permit the passage of persons toward and from the back seat.

To these and other ends, therefore, my invention consists in certain novel features and combinations of parts together with their equivalents, such as will be more fully described hereinafter, and particularly pointed out in the claims.

In the accompanying drawings, Figure (1) is a perspective view of one embodiment of my invention, the vehicle being shown in dotted lines, and dotted lines illustrating the position assumed by the seat when out of use; Fig. (2) is a view showing the seat raised to permit the passage of a person; and Figs. (3) (4) and (5) are detail views of some of the parts.

The seat consists preferably of a rectangular frame (1) of tubing adapted to support a removable cushion (2), the frame provided with a hinged back (3) adapted to fold down over the cushion, as shown in dotted lines in Fig. (1). The opposite ends of the seat frame are slidingly received in horizontal sleeves (4) (4) carried by the downwardly extending tubes (5) (5), the sleeves each being provided with a set collar (6), rotatable, but incapable of longitudinal movement relative to the sleeve. The seat frame, by means of this construction, is capable of horizontal adjustment toward and from the front and rear seats, to afford more or less foot and leg room to those occupying the back and auxiliary seats. The set collars are, of course, provided with set screws (7) (7).

The downwardly extending tubes (5) (5) are designed to telescope over the upwardly extending rods (8) (8) conveniently shouldered, as at 9, to limit the telescopic movement of the tubes (5) (5) thereon, a set screw (10) or other suitable stop being provided for each tube (5), to adjust the vertical height of the seat from the floor or bottom of the tonneau. The tubes and rods combine to form legs or supports for the seat, and it is obvious that other adjusting means other than set screws might be used without departing from the spirit and scope of my invention.

The lower ends of the rods may or may not be pivotally secured to the feet (11) (11), and while I have shown them as being pivoted thereto, such construction is not at all necessary. These feet are preferably rectangular in shape and are each provided with a longitudinally extending slot (12), through which a pin or bolt (13) passes, the pins or bolts being secured to the brackets (14) (14). These brackets are fixed to the floor of the vehicle and lie adjacent the sides of the same just in rear of the side door opening (15), where they will be out of the way. The base of each bracket is recessed as at (16) to receive and form sockets for the lower ends of the respective feet (11), which enter and leave the recesses by reason of the slot (12). The side of each bracket is also provided with a rest (17), against which the feet bear when the seat is in use, to limit the rearward movement of the seat.

It has been heretofore explained how the seat is adjustable both horizontally and vertically.

Assuming that the seat is in the position shown in full lines and it is desired to permit the access of persons to the rear seat or the door, all that is necessary is to loosen the set screw (10) on that side of the vehicle through which the person passes and lift that end of the seat, the opposite tubular end of the seat rotating in the opposite sleeve (4), the set collar rotating with the tubular end and relative to the sleeve. After the person has passed in or out, the seat is returned, the tube (5) telescoped over rod (8) and the set screw or other fastening tightened. Either end of the seat may be raised in this manner.

In case it is desired to dispense with the seat, the latter is raised upwardly, thereby raising the feet out of the sockets (16) in the brackets, owing to the play allowed the feet by the slot (12), whereupon the seat is swung forwardly on the fixed pins (13), as pivots until the forward edge of the seat engages the floor. The set screws (10) (10) and (7) (7) are then loosened, to permit the sleeves (4) to slide to the forward edge of the seat frame, as shown in dotted lines in Fig. (1), and to permit partial or entire separation of the tubes (5) (5) and rods (8) (8), so that the seat, which is now on the edge, may be pushed up close against the front seat or beneath the overhang, if any, the back (3) being folded down upon the seat (2), as shown in dotted lines.

A reversal of this operation will bring the seat into the position shown in full lines in Fig. (1). When the seat is in the position shown by dotted lines in Fig. (1), it will be observed that the tubes (5) (5) and rods (8) (8) lie on a plane with or below the level of the threshold (18) of the vehicle, to avoid tripping those entering or leaving, and the rods and tubes lie close to the inner face of the threshold.

In case the device is to be disassembled, the cushion may be removed from the seat frame, and the latter together with the sleeves, set collars and tubes removed entirely from the machine. It is also obvious that instead of laying the seat down forwardly, it might be arranged to swing rearwardly to lie beneath the back seat.

From the foregoing, it is obvious that I have devised a most simple and inexpensive, yet highly useful article, particularly adapted for the long bodied tonneaus of touring motor cars, through by no means restricted to such use, and it is further evident that many changes might be made in the form and arrangement of the several parts described, without departing from the spirit and scope of my invention, and hence, I do not wish to limit myself to the exact construction herein set forth.

Having thus fully described my invention, what I claim as new is:

1. A seat for vehicles comprising a frame extending across the vehicle, hinged legs for supporting the frame, means for releasably retaining the legs in upright position, the frame adapted to slide horizontally relative to the legs, and means for releasably retaining the frame in its adjusted position relative to the legs.

2. A seat for vehicles comprising a frame, legs for supporting the frame, the frame having a horizontally slidable connection with the legs, and means engaging both legs and seat frame for retaining the frame in its adjusted position relative to the legs.

3. A seat for vehicles comprising a frame, legs for supporting the seat, sleeves carried by the legs for slidingly connecting the seat therewith to permit an adjustment of the seat in a plane perpendicular to the plane of the legs, and means for retaining the seat in its adjusted position relative to the sleeves.

4. An auxiliary seat for vehicles comprising a frame, separable telescopic members for supporting the frame at opposite ends, one of said telescopic members being pivotally secured to the respective ends of the frame, to permit either end of the frame to be swung vertically.

5. A seat for vehicles comprising a frame, separable telescopic members for supporting the frame, one of the members at each end being pivotally and slidingly secured to the frame, and set collars connected and rotatable relative to the pivotal members to retain the seat in adjusted position relative to the pivotal members.

6. The combination with a vehicle, of a removable seat comprising a frame, legs removably mounted in the vehicle, the frame having a horizontally slidable connection with the legs, and means engaging the legs and frame, and relative to which the frame slides for releasably retaining the frame in its adjusted position relative to the legs.

7. A vehicle seat comprising a tubular frame, legs, sleeves on the legs, the frame being slidingly received in the sleeves, and means for adjustably retaining the sleeves and frame together.

8. A vehicle seat comprising a frame, telescopic legs, each composed of two separable members, sleeves carried by one of the members of each leg, the opposite ends of the frame slidingly received in the sleeves, and locking means rotatably connected with the sleeves for retaining the sleeves and frame in adjusted position.

9. A vehicle seat comprising a frame, adjustable legs supporting the frame, suitably supported brackets provided with sockets or seats conforming to the shape of and adapted to receive the lower ends of the legs, the legs being slotted, a fixed pin passing through the slots and rests adapted to limit the movement of the seat in one direction.

10. A vehicle seat comprising a frame, swinging legs for supporting the frame, the seat being transversely slidable relative to the legs.

11. The combination with a vehicle having front and rear seats, of an auxiliary seat located in the space between the front and rear seats, and extending from side to side of the vehicle, and separable supports hinged to the opposite ends of the seat to permit either end of the seat to be raised vertically.

12. A vehicle seat comprising a frame, vertically adjustable slotted legs supporting the frame, the frame horizontally adjustable relative to the legs, recessed brackets, the ends of the legs removably receivable in the recesses in the brackets, pins carried by the brackets and passing through the slots in the legs, and means for limiting the swinging movement of the legs in one direction and for bracing the legs.

13. The combination with a vehicle having front and rear seats, of an auxiliary seat located in the space between the front and rear seats, and supports slidably and pivotally attached to the seat, the supports being also pivotally mounted relative to the vehicle to permit the seat to be swung downward and slid to one limit of its movement relative to the supports.

In testimony whereof, I affix my signature in presence of two witnesses.

JAMES BERT PITCHER.

Witnesses:
RALPH S. WARFIELD,
G. L. HUMPHREY.